United States Patent
Schmidt et al.

(10) Patent No.: US 9,741,121 B2
(45) Date of Patent: *Aug. 22, 2017

(54) PHOTOGRAPH LOCALIZATION IN A THREE-DIMENSIONAL MODEL

(71) Applicant: AUTODESK, INC., San Rafael (CA)

(72) Inventors: Ryan Schmidt, Toronto (CA); Ramtin Attar, Toronto (CA); Azam Khan, Aurora (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/067,077

(22) Filed: Mar. 10, 2016

(65) Prior Publication Data

US 2016/0196655 A1 Jul. 7, 2016

Related U.S. Application Data

(63) Continuation of application No. 14/059,274, filed on Oct. 21, 2013, now Pat. No. 9,305,355.

(51) Int. Cl.
  *G06K 9/00* (2006.01)
  *G06T 7/00* (2017.01)
  *G06K 9/46* (2006.01)
  *G06K 9/62* (2006.01)
  *G06T 7/73* (2017.01)

(52) U.S. Cl.
  CPC ........ *G06T 7/0044* (2013.01); *G06K 9/00208* (2013.01); *G06K 9/00671* (2013.01); *G06K 9/4609* (2013.01); *G06K 9/6202* (2013.01); *G06T 7/74* (2017.01); *G06T 2207/10012* (2013.01); *G06T 2207/10028* (2013.01)

(58) Field of Classification Search
  CPC ........ G06T 7/0044; G06T 2207/10012; G06T 2207/10028; G06K 9/00208; G06K 9/4609; G06K 9/6202
  See application file for complete search history.

(56) References Cited

U.S. PATENT DOCUMENTS

| | | | |
|---|---|---|---|
| 6,226,004 B1 | 5/2001 | Nishihara | |
| 8,933,993 B1 | 1/2015 | Flynn et al. | |
| 9,053,194 B2 * | 6/2015 | Sawhney | G06F 17/3087 |
| 9,218,529 B2 * | 12/2015 | Lewis | G06K 9/0063 |
| 9,305,355 B2 * | 4/2016 | Schmidt | G06T 7/0044 |

(Continued)

*Primary Examiner* — Gregory M Desire
(74) *Attorney, Agent, or Firm* — Artegis Law Group, LLP (57) ABSTRACT

A photo localization application is configured to determine the location that an image depicts relative to a 3D representation of a structure. The 3D representation may be a 3D model, color range scan, or gray scale range scan of the structure. The image depicts a particular section of the structure. The photo localization application extracts and stores features from the 3D representation in a database. The photo localization application then extracts features from the image and compares those features against the database to identify matching features. The matching features form a location fingerprint, from which the photo localization application determines the location that the image depicts, relative to the 3D representation. The location allows the user to better understand and communicate information captured by the image.

20 Claims, 7 Drawing Sheets (56) References Cited

U.S. PATENT DOCUMENTS

| | | | |
|---|---|---|---|
| 2003/0066949 A1* | 4/2003 | Mueller | G01B 11/00 250/208.1 |
| 2004/0258309 A1* | 12/2004 | Keaton | G06K 9/6255 382/190 |
| 2009/0196508 A1* | 8/2009 | Sullender | G06K 9/4638 382/201 |
| 2012/0259594 A1 | 10/2012 | Khan et al. | |
| 2012/0296610 A1 | 11/2012 | Hailemariam et al. | |
| 2013/0129194 A1 | 5/2013 | Gusis et al. | |
| 2013/0332482 A1 | 12/2013 | Son et al. | |
| 2014/0301645 A1* | 10/2014 | Mattila | G06K 9/00476 382/182 |
| 2015/0110385 A1 | 4/2015 | Schmidt et al. | |

* cited by examiner

PHOTOGRAPH LOCALIZATION IN A THREE-DIMENSIONAL MODEL

CROSS-REFERENCE TO RELATED APPLICATIONS

This application is a continuation of the co-pending U.S. patent application titled, "PHOTOGRAPH LOCALIZATION IN A THREE-DIMENSIONAL MODEL," filed on Oct. 21, 2013 and having Ser. No. 14/059,274. The subject matter of this related application is hereby incorporated herein by reference.

BACKGROUND OF THE INVENTION

Field of the Invention

Embodiments of the present invention generally relates to computer graphics; and, more specifically, to techniques for localizing an image to a position within a 3D representation of a structure.

Description of the Related Art

It is common during the construction and maintenance of large structures, such as buildings, for building managers and contractors to rely upon three-dimensional (3D) models, 3D scans, and images of the structures. Images are a great medium to capture information about a structure. A user may capture images to document information about the structure. For instance, a user may evaluate the progress of construction on a new building by comparing images with a 3D model of the building.

Typically, the images are stored within the file system of a computer. The user organizes the images by a naming convention or stores the images in files according to the location and time that the user captured the images. This technique of manually organizing the images may allow the user to track a small collection of such images.

However, as the collection of images expands and/or the user shares the images with others, the relationship between the images and the location shown in the images may be lost. If a user can no longer relate an image to a physical location within a structure, then the value of the image may be lost. For instance, a user may receive a series of images, without location information, documenting work on a new building. If the user spots a problem with the work and decides to have the problem repaired, the user needs to know where in the building to direct the repair. To determine the location of the repair, the user may then have to search through the building instead of just looking up the location shown in the image. For a large building this search may waste valuable time.

As the foregoing illustrates, what is needed in the art is a more effective approach for determining the physical location that an image depicts.

SUMMARY OF THE INVENTION

One embodiment of the invention includes a computer-implemented method for determining the location that an image depicts relative to a three-dimensional (3D) representation of a structure. The method includes identifying features in the image, identifying features in the 3D representation that match the features identified in the image, and estimating the location depicted by the image based upon the locations associated with the features identified in the 3D representation.

One advantage of the disclosed technique is that the user is able to match a image to a location within a structure. With the location, the user can better understand and communicate information captured by the image.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments presented herein provide techniques for localizing an image within a 3D representation of a structure. In one embodiment, a location depicted by an image is determined relative to a 3D representation of a structure, such as a 3D model or 3D scan of a building. The 3D representation is mapped to the structure, so features and locations within the 3D representation correspond to physical features and locations within the structure.

The user may also have an image depicting a portion of the structure. Although the image may include important information about the structure, the user may not know the location that the image depicts, i.e., the location of a portion of the structure. For instance, the user could have an image of broken equipment, but not know where the broken equipment is located within a particular building.

Accordingly, in one embodiment, an application localizes the image relative to the 3D representation. The user may select the image and 3D representation through a graphical user interface (GUI) of the application. The application extracts features from the 3D representation and the image. Features from the 3D representation correspond to distinct locations within the 3D representation, such that a set of features act as a location fingerprint. The application may store the features and associated locations in a database. The application matches features from the image with features from the 3D representation. The application determines the location shown in the image relative to the 3D representation based on the location fingerprint of the matching features. The application then reports the location to the user.

For example, a user could have a 3D model of a building and a set of images documenting work performed within the building. If the user notices a problem while reviewing the images, such as a piece of equipment installed incorrectly, then the user has to communicate where and how to repair the problem. To do so, the user needs to know the location that the image depicts. The application determines the location shown in the image and thus the user learns the location of the problem.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
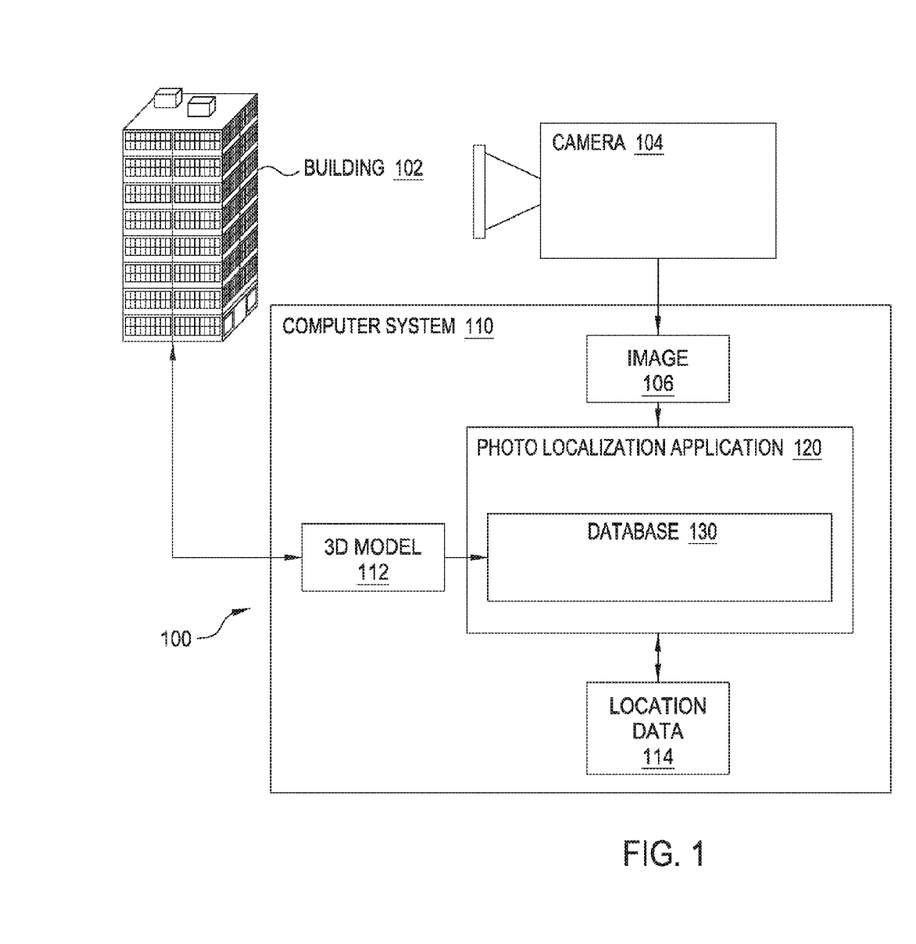
FIG. 1 illustrates a system for determining the location that an image depicts, relative to a three dimensional (3D) representation of a structure, according to one embodiment.

FIG. 1 illustrates a system for determining the location depicted by an image, relative to a three dimensional (3D) representation of a structure, according to one embodiment. As shown, photo localization system 100 includes a building 102, a camera 104 and a computing system 110. The computing system 110 includes a 3D model 112, a photo localization application 120, an image 106, and a location data 114. The image 106 depicts a portion of the building 102. The camera 104 captures and transmits the image 106 to the computer system 110. The photo localization application 120 is configured to determine the location depicted by the image 106, relative to the 3D model 112. To do so, the photo localization application 120 extracts features from the 3D model 112 that identify distinct locations within the structure, extracts features from the image 106, and matches the features from the image 106 to features from the 3D model 112. The matching features form a location fingerprint from which the photo localization application 120 estimates the location depicted by the image 106.

In one embodiment, the 3D model 112 includes a polygon mesh in a 3D coordinate space, where each polygon represents a portion of a surface within the building 102. The corners where polygons connect are vertices. Features of the building 102 are represented within the 3D model 112 by collections of polygons that share vertices. For instance, the 3D model 112 may represent a door in the building 102 with a collection of polygons that correspond to the faces of the door.

The photo localization application 120 includes a database 130 that the photo localization application 120 populates with features extracted from the 3D model 112. The user may select the 3D model 112, through the GUI of the photo localization application 120. The features correspond to points of interest within the building 102. The features may be image features or 3D features, as discussed below. The photo localization application 120 may associate one or more features with a location, such that the features form a location fingerprint. The location associated with a given feature, may represent the physical location of the feature or may represent the location that a camera would be placed in the building 102 to photograph the feature.

For example, the building 102 could include an air conditioning (AC) unit on the top floor and another AC unit in the basement. The 3D model 112 could include 3D geometry representing the physical configuration of these AC units. The photo localization application 120 extracts features of this 3D geometry. The photo localization application 120 determines the location of the AC unit on the top floor and the location of the AC unit in the basement. The features that the photo localization application 120 extracts for the AC unit on the top floor form a location fingerprint for the top floor and the features that the photo localization application 120 extracts for the AC unit in the basement form a location fingerprint for the basement. The photo localization application 120 stores the extracted features and associated locations of the respective AC units in the database 130.

After populating the database 130, the photo localization application 120 can determine the location that an image depicts, relative to the 3D model 112. The image 106 is a two dimensional (2D) picture of a portion of the building 102. The user may transfer the image 106 to the computer system 110 from the camera 104, e.g., via a universal serial bus (USB) connection.

To determine the location that the image 106 depicts, the user may select the image 106 with the GUI of the photo localization application 120. In other embodiments, the user may select a folder of images that the photo localization application 120 processes or the photo localization application 120 may process images that the photo localization application 120 discovers on the computer system 110.

To determine the location depicted by the image 106, the photo localization application 120 first extracts features from the image 106. The photo localization application 120 then identifies the features in database 130 that match the features from the image 106. The extraction and matching of the features from the image 106 is discussed in greater detail in conjunction with FIG. 2.

The matching features in the database 130 may form a location fingerprint from which the photo localization application 120 estimates the location depicted by the image 106, relative to the 3D model 112. The location within the 3D model 112 may represent the physical location of the features that the image 106 depicts or the physical location of the camera 104 within the building 102 when capturing the image 106.

The photo localization application 120 stores numeric coordinates that represent the location relative to the 3D model 112 as the location data 114. The photo localization application 120 presents the location data 114 to the user. The photo localization application 120 may also add the location data 114 to the image 106 as metadata. For many applications, a general location, such as a floor or room number, is adequate. Accordingly, in other embodiments, the location data 114 may include a text description of the location that the image 106 depicts. For example, if the photo localization application 120 determines that the image 106 depicts a portion of the fifth floor of a building 102, then the photo localization application 120 could store the text "5th floor" as the location data 114.

Returning to the example of AC units, the user could have an image of an AC unit with a broken pipe. The user wants to know whether the image depicts the AC unit on the top floor or the AC unit in the basement. In this example, photo localization application 120 extracts features from the image, matches the features within the database 130, determines the location that the image depicts, and reports the location to the user. The user, now knowing the location shown in the image, can proceed to the correct AC unit and repair the broken pipe.

The image 106 may include valuable information about the building 102 that is not stored within the database 130, such as an unrecorded modification. Accordingly, in one embodiment, the photo localization application 120 may add features from the image to the database 130.

Figure 2:
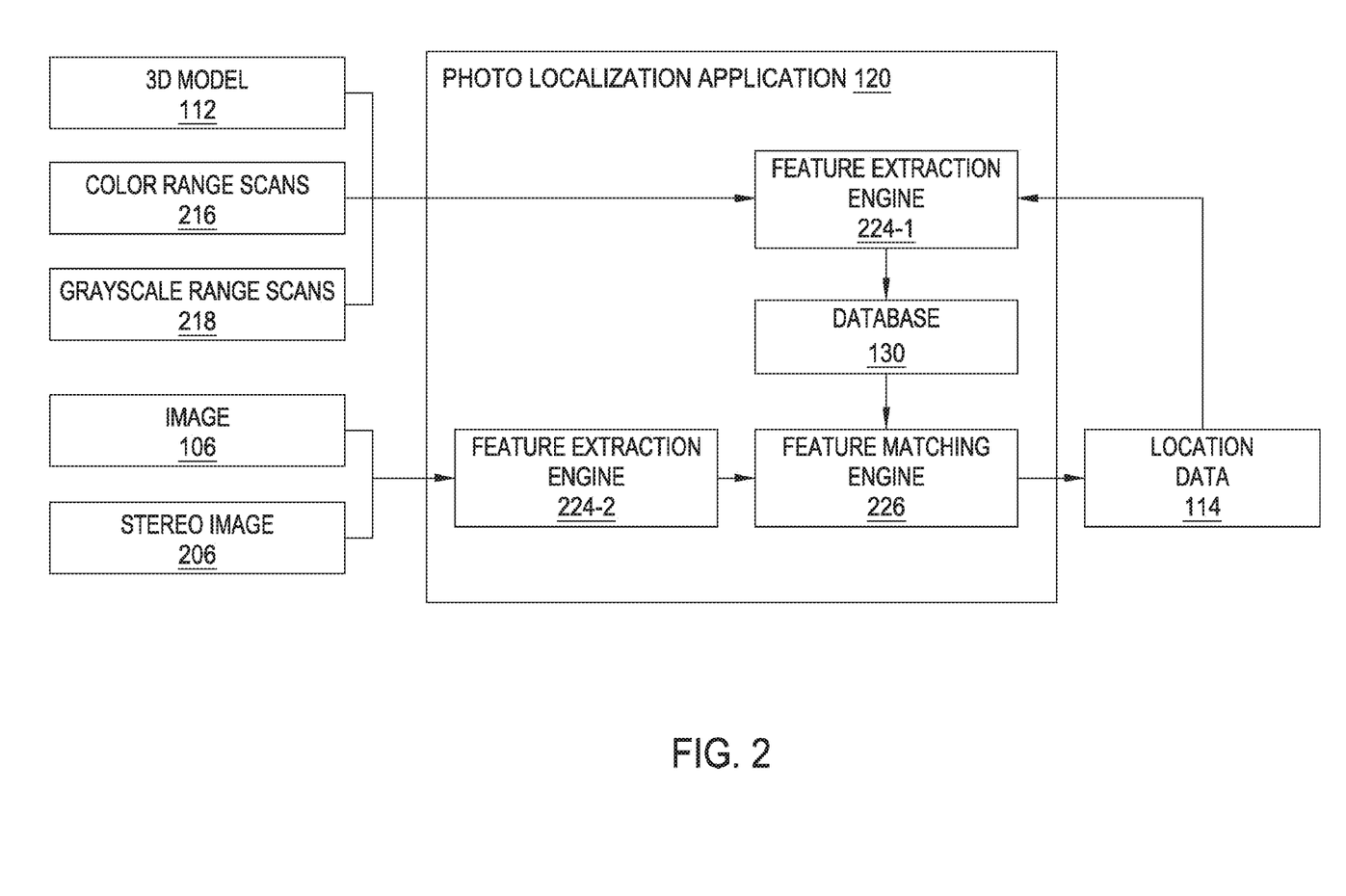
FIG. 2 illustrates a photo localization application configured to determine the location that an image depicts, according to one embodiment.

FIG. 2 illustrates a photo localization application configured to determine the location that an image depicts, according to one embodiment. In addition to some of the elements of FIG. 1, FIG. 2 also shows color range scans 216, grayscale range scans 218, and stereo image 206. FIG. 2 also illustrates feature extraction engines 224-1 and 224-2 and a feature matching engine 226 within the photo localization application 120.

In one embodiment, the photo localization application 120 populates the database 130 from the 3D model 112. The photo localization application 120 retrieves the 3D model 112. The photo localization application 120 then passes the 3D model 112 to the feature extraction engine 224-1.

The feature extraction engine 224-1 is configured to create and store image features and associated locations from the 3D model 112. Image features includes vectors describing the appearance of a point or section of interest in an image. To extract image features, the feature extraction engine 224-1 first renders images from the 3D model 112. Persons skilled in the art will recognize that many technically feasible techniques exist for rendering images from a 3D model.

The feature extraction engine 224-1 renders a large number of images from virtual cameras that the feature extraction engine 224-1 positions throughout the 3D model 112. If the 3D model 112 represents the building 102, then the feature extraction engine 224-1 renders images from virtual cameras placed at multiple locations within each room and along the exterior of the building 102. For each location, the feature extraction engine 224-1 renders images from multiple angles. In doing so, the feature extraction engine 224-1 may render multiple images for every surface of the 3D model 112.

Once rendered, the feature extraction engine 224-1 identifies image features within each image. Persons skilled in the art will recognize that many technically feasible techniques exist for extracting image features from a given image, such as the scale-invariant feature transform (SIFT) algorithm. Using the SIFT algorithm, the image features are extracted as vectors. The image features from an image form a location fingerprint for a location within the 3D model 112. The feature extraction engine 224-1 associates the image features from an image with a location, such as the location of the virtual camera used to render the image. The feature extraction engine 224-1 then stores the image features and associated location within the database 130.

As discussed, the database 130 stores features, such as image features and associated locations. The database 130 may be a relational database that includes a table of image features and a table of locations, where each image feature has a pointer to an associated location.

After populating the database 130 from the 3D model 112, the photo localization application 120 can determine the location that an image depicts, relative to the 3D model 112. The photo localization application 120 passes the image 106 to the feature extraction engine 224-2. The feature extraction engine 224-2 extracts features from the image 106. As discussed, there are many technically feasible techniques for extracting image features from a given image, such as the scale-invariant feature transform (SIFT) algorithm.

Once extracted, the photo localization application 120 passes the image features from the image 106 to the feature matching engine 226. The feature matching engine 226 is configured to match the image features from the image 106 with a set of image features in the database 130. The feature matching engine 226 compares the image features from the image 106 with the image features in the database 130. Persons skilled in the art will recognize that many technically feasible techniques exist for comparing image features, such as determining the Euclidean distance between features. The feature matching engine 226 determines the Euclidean distance for each pairing of an image feature from the image 106 and an image feature from the database 130. The feature matching engine 226 identifies the image features in the database 130 with the smallest Euclidean distance from the features of the image 106. These image features are the matching features.

The matching features form a location fingerprint from which the feature matching engine 226 identifies locations in the building. As discussed, a location associated with a matching feature may correspond to the position of the matching feature within the 3D model or to a position of a virtual camera used to render the image with the matching feature. The feature matching engine 226 estimates the location that the image 106 depicts, relative to the 3D model 112, from the set of matching features and associated locations. The location within the 3D model 112 may represent the physical location of the features that the image 106 depicts or the physical location of the camera 104 within the building 102 when capturing the image 106. Persons skilled in the art will recognize that many technically feasible techniques exist for estimating a location from a set of matching features and associated locations.

For instance, the feature matching engine 226 could perform a bundle adjustment to estimate the location of the camera 104. Using a bundle adjustment algorithm, the feature matching engine 226 calculates which of a known set of virtual camera locations, can render an image of the matching features that is similar to the image 106. The location of the virtual camera, which can render an image similar to the image 106, represents the location of the camera 104 when capturing the image 106.

The photo localization application 120 then stores numeric coordinates that represent the location relative to the 3D model 112 as the location data 114. The photo localization application 120 presents the location data 114 to the user.

In one embodiment, the photo localization application 120 may also pass the image 106 and location data 114 to the feature extraction engine 224-1. The feature extraction engine 224-1 then adds the image features from the image 106 the location data 114 to the database 130.

While described as determining the location that an image depicts, in other embodiments, the photo localization application 120 may determine the location that a stereo image 206 depicts. A stereo image includes a pair of 2D pictures. The feature extraction engine 224-2 may create a 3D depth map from the stereo image 206. The feature extraction engine 224-2 then extracts 3D features from the 3D depth map. 3D features describe the shape of a point or section of interest. Persons skilled in the art will recognize that many technically feasible techniques exist for extracting 3D features from a stereo image, such as extracting variations in surface shape. The feature matching engine 226 then matches the 3D features from the stereo image 206 to a set of features within the database 130.

Accordingly, in an alternate embodiment, the feature extraction engine 224-1 may extract 3D features from the 3D model 112. Persons skilled in the art will recognize that many technically feasible techniques exist for extracting 3D features from a 3D model. The feature extraction engine 224-1 identifies and extracts features throughout the 3D model 112. If the 3D model 112 represents the building 102, then the feature extraction engine 224-1 extracts 3D features at multiple locations within each room and along the exterior of the building 102. Once extracted, the feature extraction engine 224-1 stores each 3D feature and the location of the 3D feature within the database 130. The database 130 may store 3D features in addition or in place of image features.

The feature matching engine 226 identifies a set of matching features by comparing the 3D features from the stereo image 206 to the 3D features in the database 130. Persons skilled in the art will recognize that many technically feasible techniques exist for comparing 3D features. After determining the matching features, the feature matching engine 226 retrieves the locations associated with the matching features from the database 130. The feature matching engine 226 estimates the location that the stereo image 206 depicts from the set of matching features and associated locations.

The user may set the type of features extracted through the GUI of the photo localization application 120. If the user has images, then the user may set the photo localization application 120 to extract image features. Likewise, if the user has stereo images, then the user may set the photo localization application 120 to extract 3D features. The photo localization application 120 may also extract image features and 3D features from the 3D model 112.

In another embodiment, the photo localization application 120 may populate the database 130 from grayscale range scans 218. The grayscale range scans 218 includes a series of gray scale range scans captured throughout the building 102. A grayscale range scan includes 3D data captured from the surface of an object, such as a wall or a door within the building 102. A grayscale range scan also includes the location of the camera capturing the 3D data. The feature extraction engine 224-1 extracts 3D features and associated camera locations from the grayscale range scans 218.

Once extracted, the feature extraction engine 224-1 stores the 3D features and the associated locations within the database 130. After populating the database 130 with the 3D features, the photo localization application 120 can determine the location of a stereo image. As discussed, the feature extraction engine 224-2 extracts 3D features from the stereo image 206. The feature matching engine 226 identifies a set of matching features, by matching the 3D features from the stereo image 206 to 3D features in the database 130. Then the feature matching engine 226 retrieves the locations associated with the matching features and determines the location of the stereo image 206.

In still other embodiments, the photo localization application 120 populates the database 130 from the color range scans 216. The color range scans 216 includes a series of color range scans captured throughout the building 102. A color range scan includes color data, such as a color image, along with 3D data and camera location.

The feature extraction engine 224-1 may extract image features from the color data and/or 3D features from the 3D data of the color range scans 216. As discussed, the user may set the type of features extracted from the color range scans 216 through the GUI of the photo localization application 120.

Figure 3:
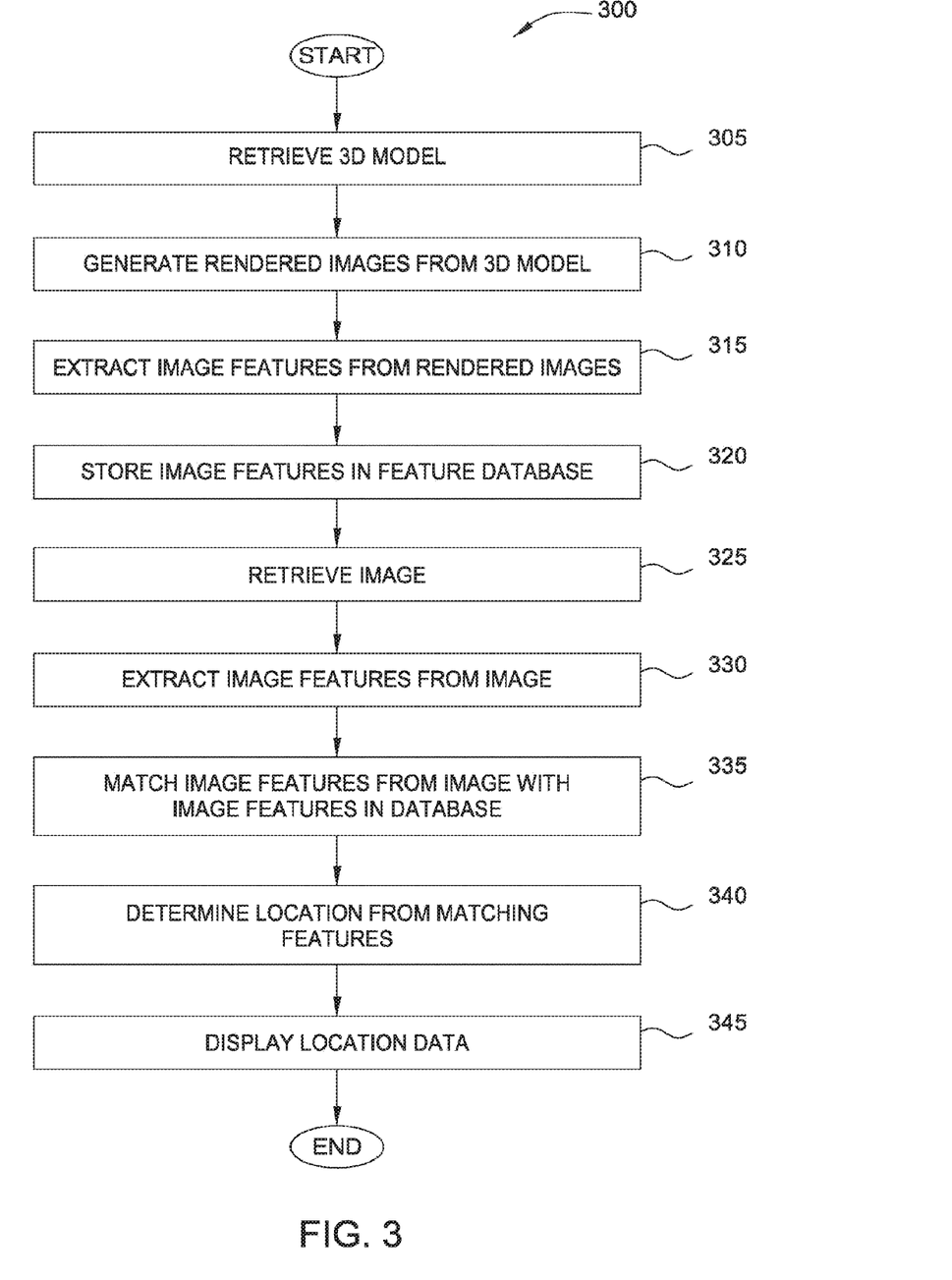
FIG. 3 illustrates a method for determining the location that an image depicts, relative to a 3D model of a structure, according to one embodiment.

FIG. 3 illustrates a method for determining the location that an image depicts, relative to a 3D model of a structure, according to one embodiment. Although the method steps are described in conjunction with the system of FIG. 1 and FIG. 2, persons skilled in the art will understand that any system configured to perform the method steps, in any order, is within the scope of the present invention.

As shown, method 300 begins at step 305, where a photo localization application 120 retrieves a 3D model 112. The 3D model 112 may include a detailed representation of a building. The photo localization application 120 passes the 3D model 112 to a feature extraction engine 224-1.

At step 310, the feature extraction engine 224-1 renders images from the 3D model 112. The feature extraction engine 224-1 renders the images from a series of virtual cameras that the feature extraction engine 224-1 positions throughout the 3D model 112. The feature extraction engine 224-1 records the location of a virtual camera with the image rendered from the virtual camera. The feature extraction engine 224-1 associates this location with features extracted from the image.

At step 315, the feature extraction engine 224-1 extracts image features from the images. The feature extraction engine 224-1 may use the SIFT algorithm to extract the image features. The feature extraction engine 224-1 associates each image feature from a given image with the location of the virtual camera used to render that image. The image features from an image form a location fingerprint for the location of the virtual camera used to render that image. At step 320, the feature extraction engine 224-1 stores the image features and associated locations within a database 130.

At step 325, the photo localization application 120 retrieves an image 106. The photo localization application 120 passes the image 106 to a feature extraction engine 224-2. At step 330, the feature extraction engine 224-2 extracts image features from the image 106. The feature extraction engine 224-2 may also use the SIFT algorithm. The feature extraction engine 224-2 passes the image features from the image 106 to a feature matching engine 226.

At step 335, the feature matching engine 226 matches the image features from the image 106 with image features in the database 130. For example, the feature matching engine 226 may determine a Euclidean distances between the image features from the image 106 and the image features in the database 130. The feature matching engine 226 identifies the image features in the database 130 with the smallest Euclidean distance from the image features of the image 106. The matching features form a location fingerprint. The feature matching engine 226 retrieves the distinct locations from the database 130 associated with the matching features.

At step 340, the feature matching engine 226 determines the location shown in the image 106 from the matching features and associated locations. The location may represent the physical location of the features that the image 106 depicts or the physical location of the camera 104 within the building 102 when the image 106 was taken. The photo localization application 120 stores numeric coordinates that represent the location, relative to the 3D model 112, as the location data 114.

At step 345, the photo localization application 120 displays the location data 114 to the user. The photo localization application 120 may also add the location data 114 to the image 106 as metadata.

Figure 4:
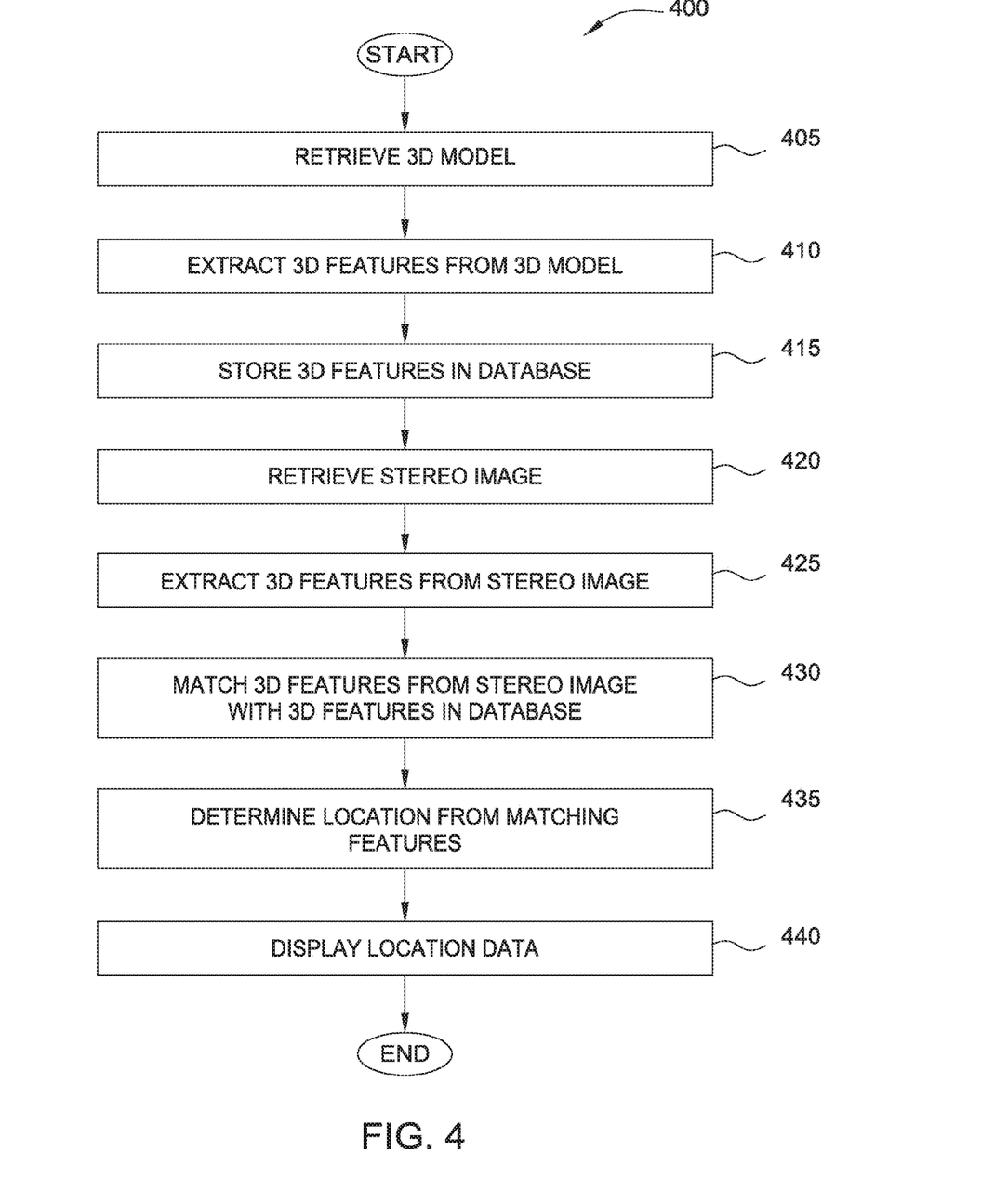
FIG. 4 illustrates a method for determining the location that a stereo image depicts, relative to a 3D model of a structure, according to another embodiment of the present invention.

FIG. 4 illustrates a method for determining the location that a stereo image depicts, relative to a 3D model of a structure, according to another embodiment of the present invention. Although the method steps are described in conjunction with the system of FIG. 1 and FIG. 2, persons skilled in the art will understand that any system configured to perform the method steps, in any order, is within the scope of the present invention.

As shown, method 400 begins at step 405, where a photo localization application 120 retrieves a 3D model 112. The photo localization application 120 passes the 3D model 112 to a feature extraction engine 224-1.

At step 410, the feature extraction engine 224-1 extracts 3D features from the 3D model 112. The 3D features may include variations in surface shape. The feature extraction engine 224-1 records a location associated with each 3D feature. Groups of 3D features form location fingerprints. At step 414, the feature extraction engine 224-1 stores the 3D features and associated locations within a database 130.

At step 420, the photo localization application 120 retrieves a stereo image 206. The photo localization application 120 passes the stereo image 206 to a feature extraction engine 224-2. At step 425, the feature extraction engine 224-2 extracts 3D features from the stereo image 206. The feature extraction engine 224-2 passes the 3D features from the stereo image 206 to a feature matching engine 226.

At step 430, the feature matching engine 226 matches 3D features from the stereo image 206 with 3D features stored in the database 130. The matching features form a location fingerprint. The feature matching engine 226 retrieves the locations associated with each of the matching features within the database 130. At step 435, the feature matching engine 226 determines the location that the stereo image 206 depicts from the matching features and associated locations. The photo localization application 120 stores numeric coordinates that represent the location relative to the 3D model 112 as the location data 114.

At step 440, the photo localization application 120 displays the location data 114 to the user. The photo localization application 120 may also add the location data 114 to the stereo image 206 as metadata.

Figure 5:
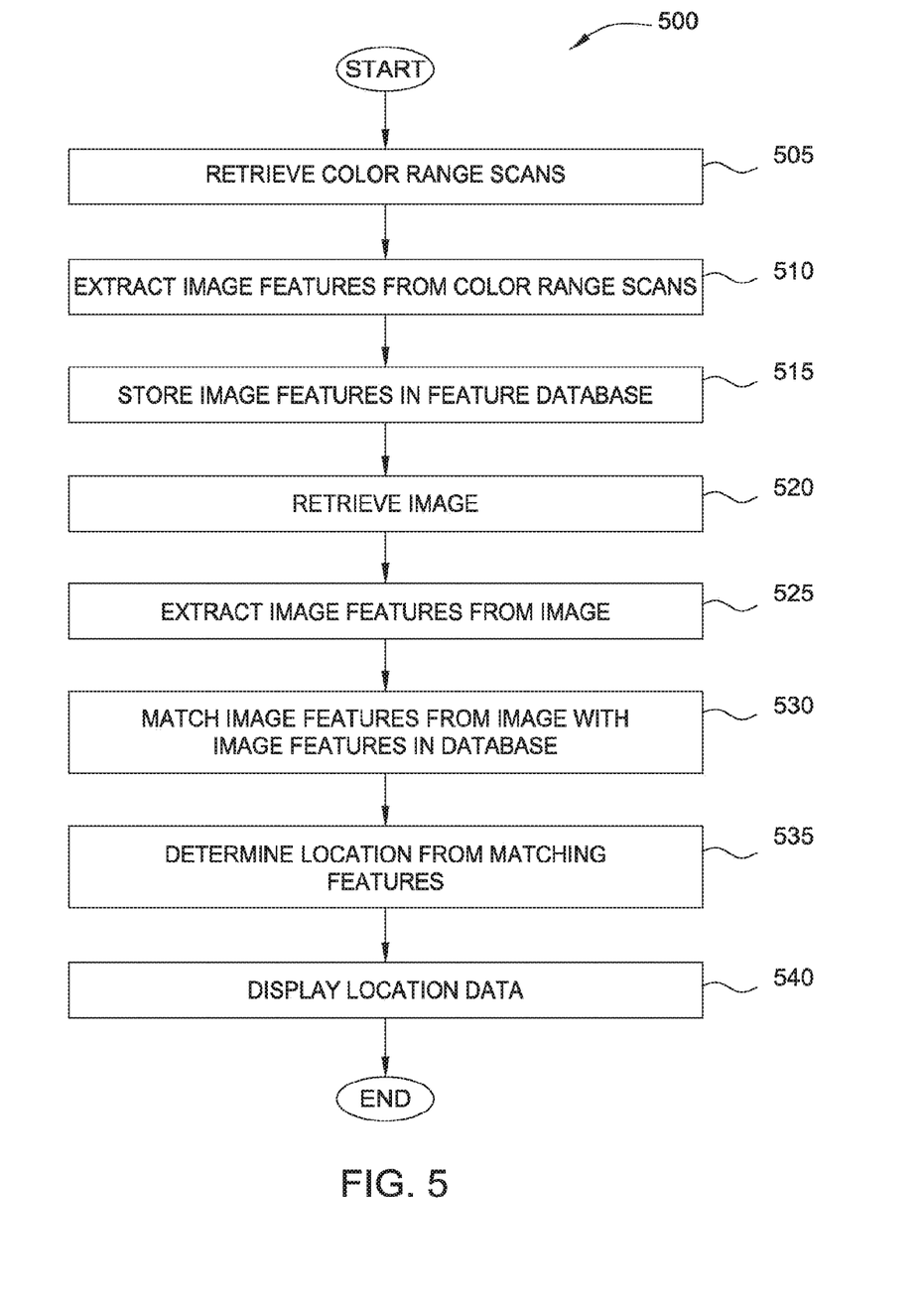
FIG. 5 illustrates a method for determining the location that an image depicts, relative to color range scans, according to one embodiment of the present invention.

FIG. 5 illustrates a method for determining the location that an image depicts, relative to color range scans, according to one embodiment of the present invention. Although the method steps are described in conjunction with the system of FIG. 1 and FIG. 2, persons skilled in the art will understand that any system configured to perform the method steps, in any order, is within the scope of the present invention.

As shown, method 500 begins at step 505, where a photo localization application 120 retrieves color range scans 216. The photo localization application 120 passes the color range scans 216 to a feature extraction engine 224-1.

At step 510, the feature extraction engine 224-1 extracts image features from the color range scans 216. The image features from a color range scan form a location fingerprints for the camera location of the color range scan. The feature extraction engine 224-1 associates the image features from a given color range scan with the camera location of that color range scan. At step 515, the feature extraction engine 224-1 stores the image features along with the associated camera locations in a database 130.

At step 520, the photo localization application 120 retrieves an image 106. The photo localization application 120 passes the image 106 to a feature extraction engine 224-2. At step 525, the feature extraction engine 224-2 extracts image features from the image 106. The feature extraction engine 224-2 passes the image features from the image 106 to a feature matching engine 226.

At step 530, the feature matching engine 226 matches the image features from the image 106 with image features in the database 130. The matching features form a location fingerprint. The feature matching engine 226 retrieves the locations associated with the matching features from the database 130. At step 535, the feature matching engine 226 determines the location that the image 106 depicts from the matching features and the associated locations. The photo localization application 120 stores numeric coordinates that represent the location relative to the color range scans 216 as the location data 114. At step 540, the photo localization application 120 displays the location data 114 to the user.

Figure 6:
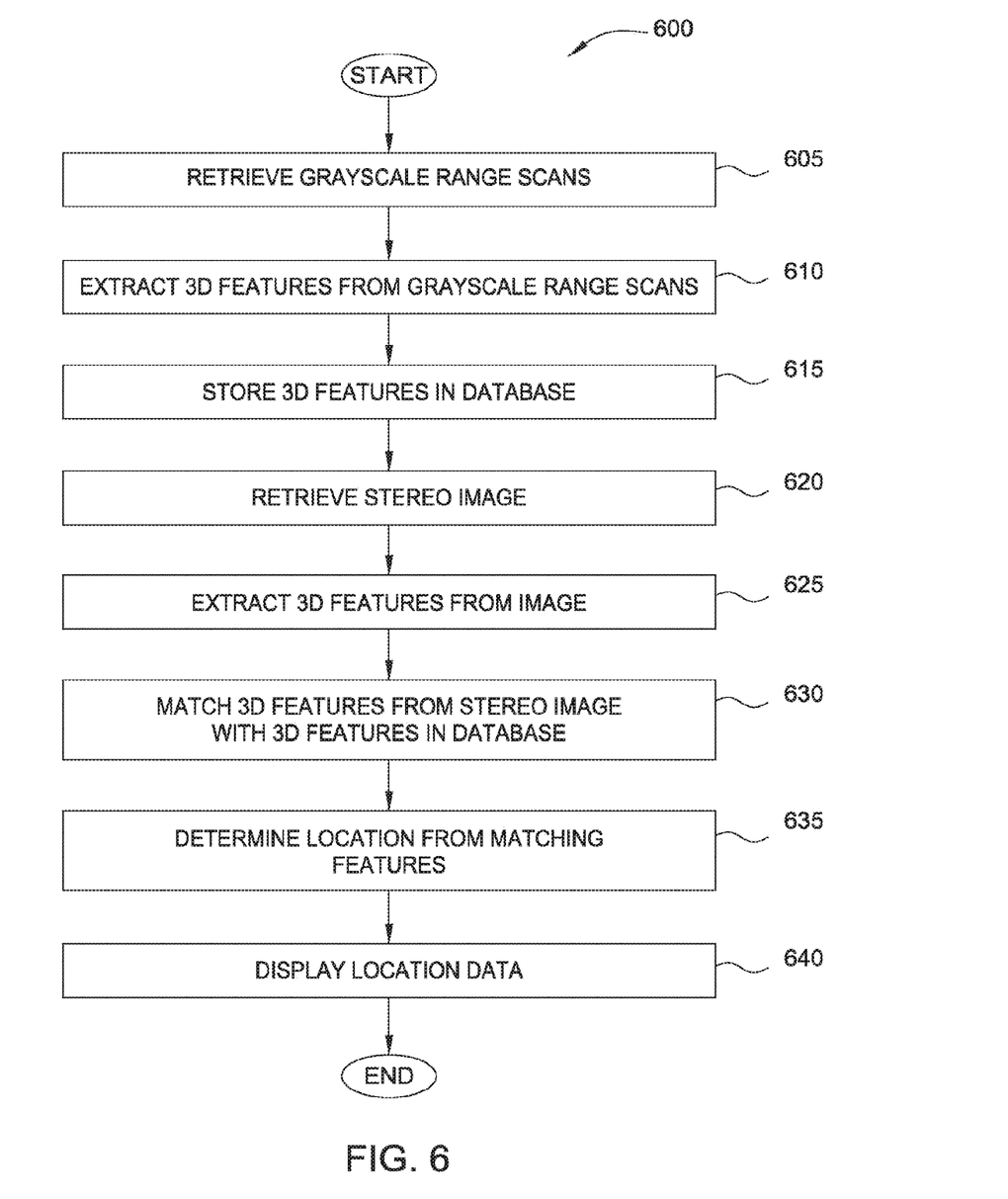
FIG. 6 illustrates a method for determining the location that an image depicts, relative to grayscale range scans, according to one embodiment of the present invention.

FIG. 6 illustrates a method for determining the location that an image depicts, relative to grayscale range scans, according to one embodiment of the present invention. Although the method steps are described in conjunction with the system of FIG. 1 and FIG. 2, persons skilled in the art will understand that any system configured to perform the method steps, in any order, is within the scope of the present invention.

As shown, method 600 begins at step 605, where a photo localization application 120 retrieves grayscale range scans 218. As discussed, a grayscale range scan includes 3D data and camera location. The photo localization application 120 passes the grayscale range scans 218 to a feature extraction engine 224-1.

At step 610, the feature extraction engine 224-1 extracts 3D features from the grayscale range scans 218. The image features from a grayscale range scan form a location fingerprints for the camera location of the grayscale range scan. The feature extraction engine 224-1 associates the 3D features from a given grayscale range scan with the camera location of that grayscale range scan. At step 615, the feature extraction engine 224-1 stores the 3D features along with the associated camera locations in a database 130.

At step 620, the photo localization application 120 retrieves a stereo image 206. The photo localization application 120 passes the stereo image 206 to a feature extraction engine 224-2. At step 625, the feature extraction engine 224-2 extracts 3D features from the stereo image 206. The feature extraction engine 224-2 passes the 3D features from the stereo image 206 to a feature matching engine 226.

At step 630, the feature matching engine 226 matches the 3D features from the stereo image 206 with 3D features in the database 130. The matching features form a location fingerprint. The feature matching engine 226 retrieves the locations from the database 130 that are associated with the matching features. At step 635, the feature matching engine 226 determines the location that the stereo image 206 depicts from the matching features and associated locations. The photo localization application 120 stores numeric coordinates that represent the location relative to the grayscale range scans 218 as the location data 114. At step 640, the photo localization application 120 displays the location data 114 to the user.

Figure 7:
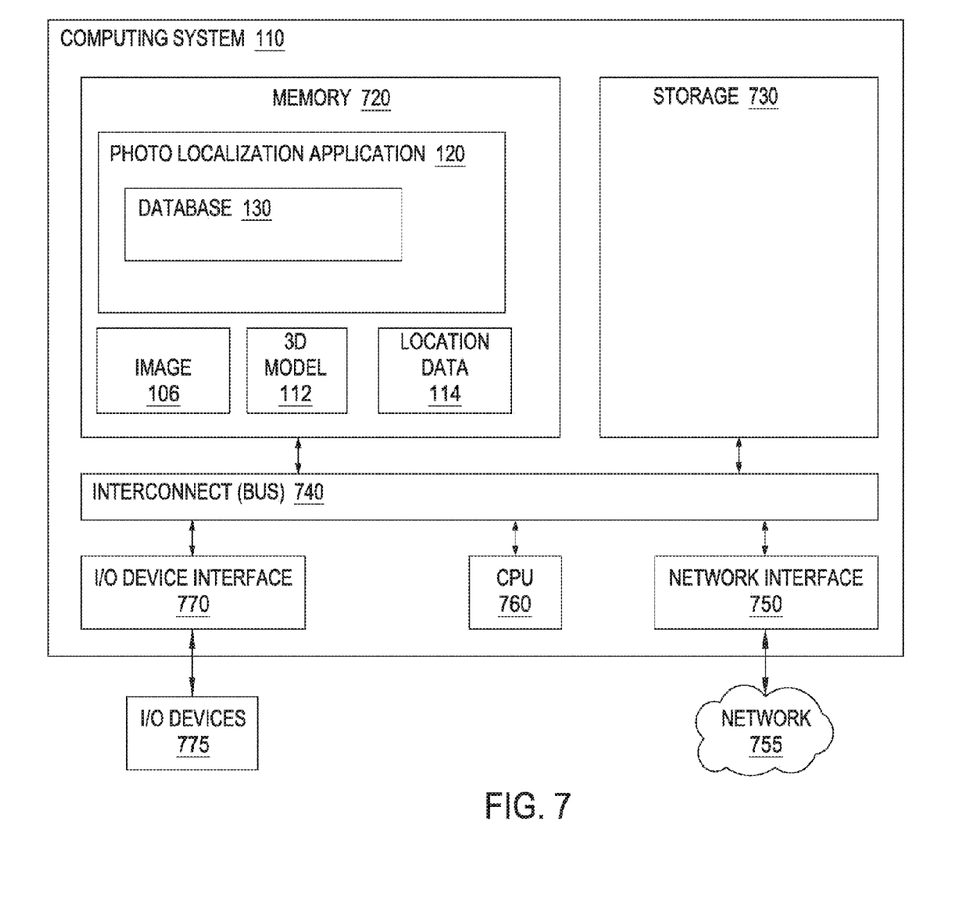
FIG. 7 illustrates a computing system 110 configured to implement one or more aspects of the present invention.

FIG. 7 illustrates a computing system 110 configured to implement one or more aspects of the present invention. As shown, the computing system 110 includes, without limitation, a central processing unit (CPU) 760, a network interface 750 coupled to a network 755, a memory 720, and storage 730, each connected to a bus 740. The computing system 110 may also include an I/O device interface 770 connecting I/O devices 775 (e.g., keyboard, display, mouse, three-dimensional (3D) scanner, and/or touchscreen) to the computing system 110. Further, in context of this disclosure, the computing elements shown in computing system 110 may correspond to a physical computing system (e.g., a system in a data center) or may be a virtual computing instance executing within a computing cloud.

The CPU 760 retrieves and executes programming instructions stored in the memory 720 as well as stores and retrieves application data residing in the storage 730. The interconnect 740 is used to transmit programming instructions and application data between the CPU 760, I/O devices interface 770, storage 730, network interface 750, and memory 720. Note, CPU 760 is included to be representative of a single CPU, multiple CPUs, a single CPU having multiple processing cores, and the like. And the memory 720 is generally included to be representative of a random access memory. The storage 730 may be a disk drive storage device. Although shown as a single unit, the storage 730 may be a combination of fixed and/or removable storage devices, such as fixed disc drives, removable memory cards, or optical storage, network attached storage (NAS), or a storage area-network (SAN).

Illustratively, the memory 720 includes a 3D model 112, an image 106, a location data 114, and a photo localization application 120. As discussed, the 3D model 112 may include a polygon mesh in a 3D coordinate space, where each polygon represents a portion of a surface within a structure. The image 106 includes an image of a portion of the structure. The photo localization application 120 creates the location data 114 by determining the location that the image 106 depicts, relative to the 3D model 112. In other embodiments of the invention, the memory 720 may include color range scans; grayscale range scans; and stereo images.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly; to be regarded in an illustrative rather than a restrictive sense.

We claim:

1. A computer-implemented method for determining a location within a structure, the method comprising:
    identifying a first feature included in a first image depicting the structure;
    rendering, via a processor, a second image depicting a first location within a three-dimensional (3D) representation of the structure; and
    estimating a location in the structure depicted in the first image based on the first location depicted in the second image.

2. The method of claim 1, further comprising:
    selecting one or more additional locations within the 3D representation of the structure; and
    for each additional location:
        extracting one or more features from the 3D representation; and
        associating in a database the one or more features with the additional location.

3. The method of claim 2, wherein extracting the one or more features comprises:
    positioning a virtual camera at one of the additional locations;
    rendering a third image with the virtual camera that represents a portion of the 3D representation; and
    extracting one or more image features from the third image.

4. The method of claim 2, wherein the one or more features correspond to physical features of the structure.

5. The method of claim 1, wherein the first image comprises a two-dimensional (2D) image.

6. The method of claim 1, wherein the first image comprises a stereo image.

7. The method of claim 6, wherein identifying the first feature included in the first image comprises:
    creating a 3D depth map based on the first image; and
    identifying one or more 3D features included in the 3D depth map.

8. The method of claim 1, further comprising storing the location in the structure depicted in the first image as numeric coordinates within the 3D representation or as a text description of the location.

9. A non-transitory computer-readable storage medium storing instructions that, when executed by a processor, cause the processor to perform the steps of:
    identifying a first feature included in a first image depicting the structure;
    rendering, via the processor, a second image depicting a first location within a three-dimensional (3D) representation of the structure; and
    estimating a location in the structure depicted in the first image based on the first location depicted in the second image.

10. The non-transitory computer-readable medium of claim 9, further comprising:
    selecting one or more additional locations within the 3D representation of the structure; and
    for each additional location:
        extracting one or more features from the 3D representation; and
        associating in a database the one or more features with the additional location.

11. The non-transitory computer-readable medium of claim 10, wherein extracting the one or more features comprises:
    positioning a virtual camera at one of the additional locations;
    rendering a third image with the virtual camera that represents a portion of the 3D representation; and
    extracting one or more image features from the third image.

12. The non-transitory computer-readable medium of claim 10, wherein the one or more features correspond to physical features of the structure.

13. The non-transitory computer-readable medium of claim 9, wherein the first image comprises a two-dimensional (2D) image.

14. The non-transitory computer-readable medium of claim 9, wherein the first image comprises a stereo image.

15. The non-transitory computer-readable medium of claim 14, wherein identifying the first feature included in the first image comprises:
    creating a 3D depth map based on the first image; and
    identifying one or more 3D features included in the 3D depth map.

16. The non-transitory computer-readable medium of claim 9, further comprising storing the location in the structure depicted in the first image as numeric coordinates within the 3D representation or as a text description of the location.

17. A computer system, comprising:
    a memory storing instructions; and a processor that is coupled to the memory and, when executing the instructions, is configured to perform the steps of:

identifying a first feature included in a first image depicting the structure;

rendering, via the processor, a second image depicting a first location within a three-dimensional (3D) representation of the structure; and estimating a location in the structure depicted in the first image based on the first location depicted in the second image.

18. The computer system of claim 17, wherein the processor is further configured to perform the steps of:

selecting one or more additional locations within the 3D representation of the structure; and for each additional location:
  extracting one or more features from the 3D representation; and
  associating in a database the one or more features with the additional location.

19. The computer system of claim 18, wherein extracting the one or more features comprises:

positioning a virtual camera at one of the additional locations;

rendering a third image with the virtual camera that represents a portion of the 3D representation; and extracting one or more image features from the third image.

20. The computer system of claim 18, wherein the extracted features correspond to physical features of the structure.

* * * * *

UNITED STATES PATENT AND TRADEMARK OFFICE
CERTIFICATE OF CORRECTION

PATENT NO. : 9,741,121 B2
APPLICATION NO. : 15/067077
DATED : August 22, 2017
INVENTOR(S) : Ryan Schmidt, Ramtin Attar and Azam Khan It is certified that error appears in the above-identified patent and that said Letters Patent is hereby corrected as shown below:

On the Title Page (71) Applicant:
Please delete "San Rafael (CA)" and insert --San Rafael, (CA) US--.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*